United States Patent [19]
Farr

[11] Patent Number: 4,893,881
[45] Date of Patent: Jan. 16, 1990

[54] HYDRAULIC ANTI-LOCK BRAKING SYSTEMS FOR VEHICLES

[75] Inventor: Glyn P. R. Farr, Warwickshire, England

[73] Assignee: Lucas Industries Public Limited Company, Birmingham, England

[21] Appl. No.: 249,443

[22] Filed: Sep. 26, 1988

[30] Foreign Application Priority Data

Oct. 3, 1987 [GB] United Kingdom ............... 8723269

[51] Int. Cl.⁴ .......................... B60T 8/34; B60T 8/32
[52] U.S. Cl. ................................... 303/113; 303/84.2; 303/111; 303/92
[58] Field of Search ............... 303/113, 115, 117, 119, 303/68–69, 61–63, 110, 111, 6.01, 9.61, 9.62, 9.63, 9.71, 9.72, 84.2, 92, 98, 99, 96; 188/181 R, 151 A

[56] References Cited

U.S. PATENT DOCUMENTS

| | | | |
|---|---|---|---|
| 3,674,317 | 7/1972 | Mangold | 303/111 |
| 3,874,745 | 4/1975 | Peruglia et al. | 303/115 X |
| 3,891,278 | 6/1975 | Grosseau | 303/115 X |
| 3,975,060 | 8/1976 | Hirayama | 303/9.63 |
| 3,977,731 | 8/1976 | Kasahara | 303/9.63 |
| 4,159,853 | 7/1979 | Oberthuer et al. | 303/9.72 |
| 4,421,362 | 12/1983 | Shirai et al. | 303/115 |
| 4,515,412 | 5/1985 | Sato | 303/111 X |
| 4,600,244 | 7/1986 | Leiber | 303/111 |
| 4,645,272 | 2/1987 | Leiber | 303/113 X |
| 4,733,921 | 3/1988 | Farr | 303/115 X |

FOREIGN PATENT DOCUMENTS

2162267 1/1986 United Kingdom .

Primary Examiner—Douglas C. Butler
Attorney, Agent, or Firm—Baker, Maxham, Jester & Meador

[57] ABSTRACT

An anti-lock braking system incorporates a copy valve adapted to ensure that the behaviour of a brake on one rear wheel of a vehicle is copied by the brake on the other rear wheel when an anti-lock situation arises. For example, a single copy valve may be incorporated in the braking circuit for the rear wheels of a vehicle of which the behaviour of the brakes is controlled by a single modulator. In another construction, two such copy valves are incorporated in a twin assembly of a braking system of the 'X' split type. In such a construction both rear wheel brakes respond to operation of one of a pair of modulators, each responsive to signals from a speed sensor on a respective front wheel of the vehicle. The or each copy valve incorporates first and second pistons which are relatively movable in response to differential pressures from the pressure spaces of a master cylinder in order to control operation an isolating valve.

20 Claims, 3 Drawing Sheets

HYDRAULIC ANTI-LOCK BRAKING SYSTEMS FOR VEHICLES

This invention relates to hydraulic anti-lock braking systems for a vehicle of the four wheel type in which the behaviour of a braked wheel is sensed by skid sensing means which, at a skid point, is operative to actuate an anti-lock modulator for modulating the supply of brake-applying fluid to the brake of that wheel in order to prevent that wheel from locking.

When an anti-lock braking system includes two brake circuits which can operate with substantially the same pressure levels, for example the circuits incorporating the brakes on the two rear wheels of a vehicle with a sense low anti-lock philosophy, it is possible to use one anti-lock modulator for regulating both brake circuits. This is achieved by controlling a first of the two brake circuits directly and arranging for the second brake circuit to respond to the pressure levels of the first brake circuit indirectly through a control or copy valve.

Known control or copy valves comprise a balance piston for equalising the pressures in the two circuits, an isolating valve for isolating the supply of brake applying fluid to the first circuit, and means adapted to ensure the operation of one of the two circuits should the other circuit fail.

In such known control or copy valves the balance piston is usually provided with a plurality of seals co-operating with the wall of the bore in which it works. The presence of such a number of seals makes it difficult to ensure that the pressures in both brake circuits can equalise.

In GB-A 2 162 267 we have disclosed an hydraulic braking system of the kind set forth incorporating a tandem master cylinder having a primary pressure space, and a secondary pressure space, in which the modulator controls operation of brakes on both rear wheels of the vehicle, and the rear wheel brakes are interconnected by a control or copy valve which incorporates a balance piston to balance the pressures applied to both rear wheel brakes, an isolating valve to isolate the supply from the second circuit, and a separate fail-safe piston which is subjected on one side both to pressure in the primary pressure space and pressure applied to one of the rear wheel brakes, and on the other side to pressure in the secondary pressure space.

In the control or copy valve of GB-A 2 162 267 although only two seals are provided on the balance piston, the fail-safe piston is provided with three seals, and works in three separate bore portions.

According to one aspect of our invention, in an hydraulic anti-lock braking system for a vehicle of the four wheel type comprising a tandem master cylinder having a primary pressure space, and a secondary pressure space, an anti-lock modulator, and a control or copy valve, the control or copy valve comprises a housing having a first bore, and a second bore, a first piston working in the first bore and hydraulically connected at opposite ends to two separate brake means, a second piston working in the second bore and hydraulically connected at opposite ends to the pressure spaces of the master cylinder, the pistons being movable relative to each other between a first operative position, a second position in which the first piston moves relatively away from the second piston, and a third position in which the second piston moves relatively away from the first piston, and an isolating valve co-operating with both pistons, said isolating valve being in an open position when said pistons are in the first position, in a closed position when said pistons are in said second position, and in an open position when said pistons are in said third position.

This enables us to provide a simplified construction since each piston is provided with only two seals.

The second piston may be of stepped outline with the bore in which it works being of differential outline. In such a construction the second piston is normally urged by a spring relatively away from the first piston and into a rest position in which it holds the isolating valve open. When the master cylinder is operated the second piston is normally urged on each and every brake application into an advanced position in which the isolating valve is freed, in which position the isolating valve is only biassed into the open position by means of a light spring.

Normally in the first position with the modulator inoperative, the isolating valve is open which permits both brake means to be applied from the master cylinder with one of the pressure spaces being connected to one of the brake means through the modulator.

Upon operation of the modulator in response to an anti-lock signal the supply to said one brake means is cut-off and relieved, with the first piston moving relatively away from the second piston to cause the isolating valve to close, whereafter further movement of the second piston in the same direction increases the effective volume of the first bore to relieve the pressure applied to the other brake means.

Should the circuit containing the pressure space which acts on the end of the second piston remote from the first fail, then the second piston will move relatively away from the first and into the third position to ensure that the isolating valve is held open so that the other brake means can be applied.

The two brake means may comprise the separate brakes on the rear wheels of the vehicle, or they may comprise corresponding halves of two twin-piston front wheel brakes.

The anti-lock system may include a single copy valve and a single modulator for controlling the behaviour of both rear wheel brakes.

According to another aspect of our invention, in an anti-lock hydraulic system comprising an anti-lock modulator for each front wheel, and a tandem master cylinder having separate pressure spaces, each for applying one front wheel brake, and the brake on the diagonally opposite rear wheel, and a copy valve assembly, the copy valve assembly includes brake pressure control means so constructed and arranged that when two wheels on one side of the vehicle are on a low friction surface, then not only will the brake on the front wheel which is travelling over the low friction surface and the diagonally opposite rear wheel brake be relieved, but also the brake on the rear wheel which is also travelling over the low friction surface.

Conveniently this is achieved, according to yet another aspect of our invention, in a vehicle anti-lock hydraulic braking system comprising a tandem master cylinder having primary and secondary pressure spaces, and a valve assembly comprising first and second copy valves, each comprising a housing having a first bore, and a second bore, a first piston working in the first bore and hydraulically connected at opposite ends to two separate brake means, a second piston working in the second bore and hydraulically connected at opposite ends to the pressure spaces of the master cylinder, the pistons being movable relative to each other between a first operative position, a second position in which the first piston moves relatively away from the second piston, and a third position in which the second piston moves relatively away from the first piston, and an isolating valve co-operating with both pistons, said isolating valve being in an open position when said pistons are in the first position, in a closed position when said pistons are in said second position, and in an open position when said pistons are in said third position, the pressure spaces are each connected to the outer end of a respective second piston, and to the inner end of the first piston of the other valve through a respective anti-lock modulator responsive to the behaviour of a respective front wheel, with the rear wheel brakes connected to the inner ends of the bores in which the first pistons .work, whereby to control the behaviour of a front wheel brake and the brake on a diagonally opposite rear wheel.

In an anti-lock situation this enables the pressures of both rear wheel brakes to be reduced to substantially the same level in response to action from either anti-lock modulator.

Thus the system provides a "sense-low" philosophy for the rear wheel brakes.

Three embodiments of our invention are illustrated in the accompanying drawings in which:-

Figure 1:
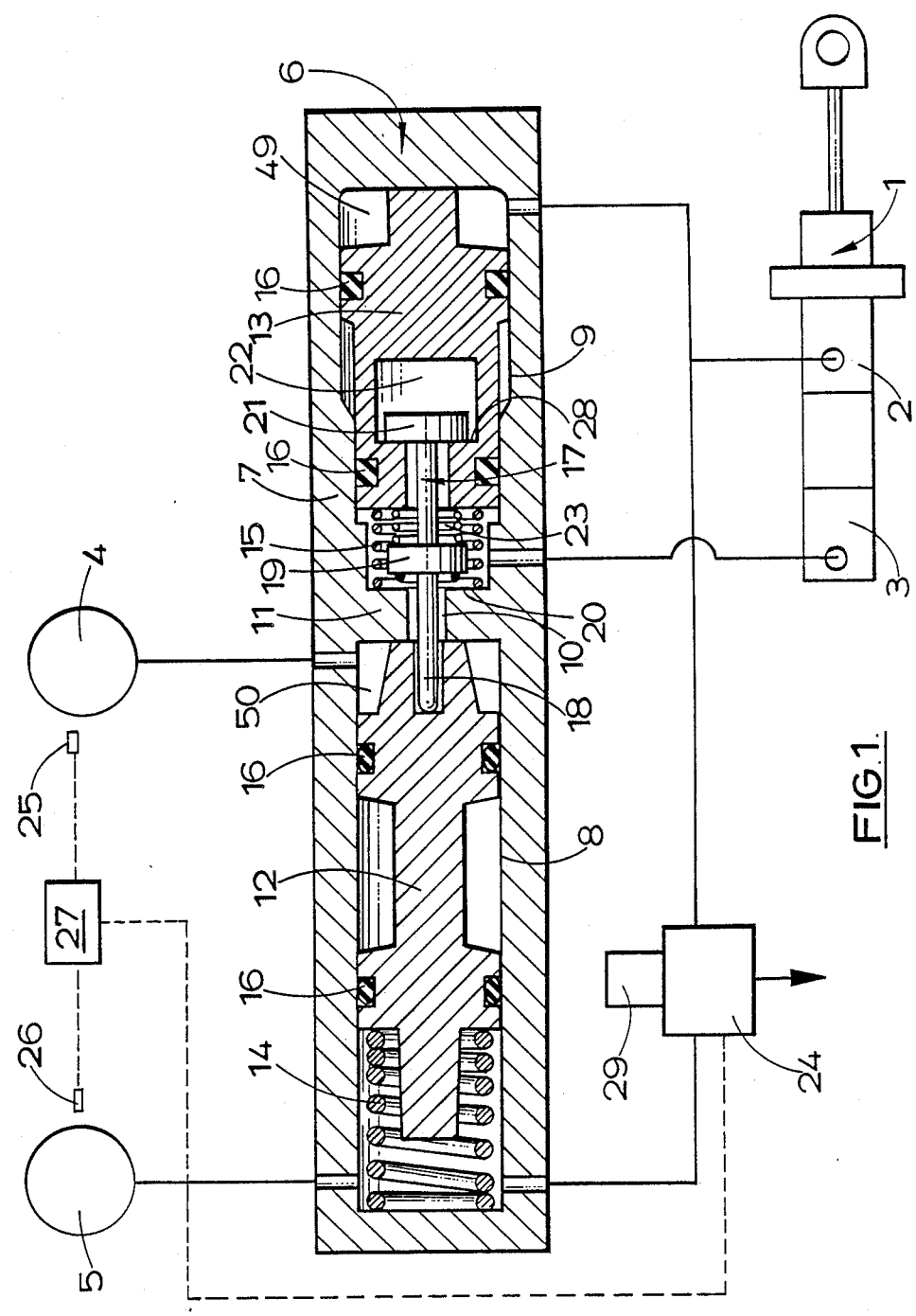
FIG. 1 is a layout of a part of an hydraulic anti-lock braking system for vehicles.

In the braking system illustrated in the layout of FIG. 1 of the drawings a tandem master cylinder 1 has primary and secondary pressure spaces 2, 3 which are both connected to brakes 4, 5 on rear wheels of an vehicle through a control or copy valve 6.

The copy valve 6 comprises a housing 7 having first and second longitudinally extending co-axial bores 8, 9 which are interconnected at their inner ends through a port 10 in a partition 11. The bore 8 is of constant diameter throughout its axial length, but the bore 9 is of stepped outline with the portion of greater diameter being disposed at a location remote from the partition 11.

A first balance piston 12 works in the first bore 8, and a second fail-safe piston 13 of differential outline works in the second bore 9. The piston 12 is urged towards the partition 11 by means of a compression spring 14, and the piston 13 is urged relatively away from the partition 11 and into engagement with the closed end of the portion of the bore 9 which is of greater diameter by means of a compression spring 15. Each piston comprises axially spaced lands, each provided with a seal 16 which has a sliding engagement with the wall of the respective bore 8, 9, and with the lands of the second piston 13 being of greater and smaller diameters.

An isolating valve 17 co-operates with both pistons 12, 13. As illustrated the isolating valve 17 comprises a stem 18 which extends axially through the port 10 and carries at an intermediate point in its length a valve head 19 for engagement with a seating 20 defined by the face of the partition 11 which is adjacent to the piston 13. An enlarged head 21 at the end of the stem 18 remote from the piston 12 is received in a recess 22 in the adjacent inner end of the piston 13 and with which it constitutes a lost-motion connection. A light spring 23 acts between the head 19 and the piston 13 to urge the head 19 towards the seating 20 and maintain the stem 18 in contact with the piston 12, at least until movement of the stem 18 with the piston 12 is arrested by the engagement of the head 19 with the seating 20. Normally the valve 17 is held open by the engagement of the head 21 with a shoulder 28 at the end of the recess 22 which is adjacent to the partition 11.

The secondary pressure space 3 is connected to the inner end of the second bore 9, and the primary pressure space 2 is connected directly to the outer end of the second bore 9 and indirectly to the outer end of the first bore 8 through an anti-lock modulator 24 adapted to be operated by an electrical solenoid 29.

The speed of rotation of each rear wheel provided with a respective brake 4, 5 is sensed by a respective speed sensor 25, 26. The signals from the speed sensors 25, 26 are fed into an electronic control module 27 which differentiates the signals and, in the event of a signal from one or both sensors indicating the presence of a potential wheel lock situation, emits an electric current to energise the solenoid 29 which actuates the modulator 24 in a manner to be described later.

In a similar manner to that described in GB-A 2 162 267 the modulator 24 may also comprise the sole modulator for the braking system with the control module 27 also being adapted to receive signals from speed sensors on the front wheels of the vehicle.

Figure 2:
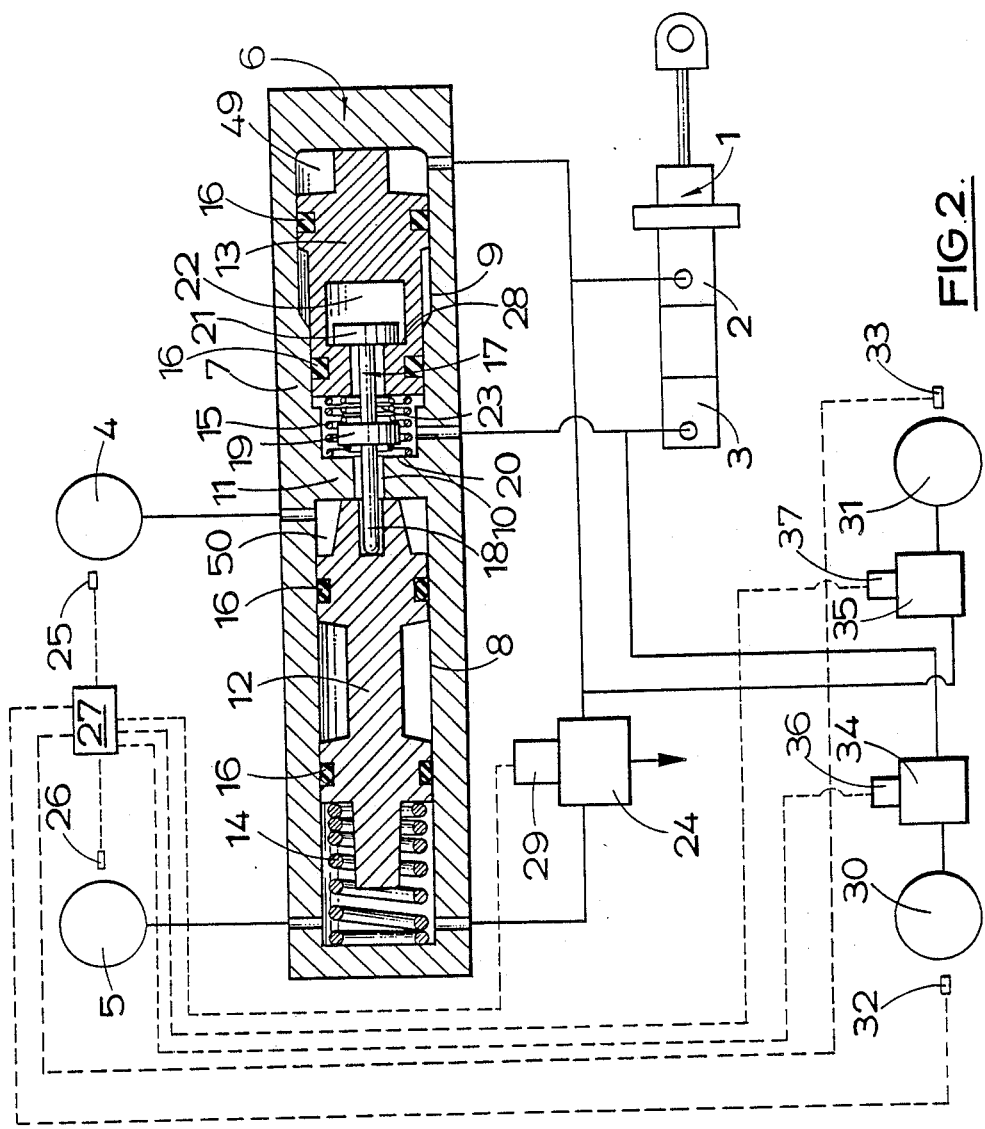
FIG. 2 is a layout of an anti-lock braking system similar to FIG. 1.

Alternatively, each front wheel may be provided with a separate modulator for controlling the behaviour of each front wheel independently of the rear wheels, for example as illustrated in FIG. 2 of the accompanying drawing.

When the brakes are to be applied normally, the master cylinder 1 is operated. Pressure at an unrestricted rate is applied from the primary pressure space 2 to the brake 5 by free passage through the modulator 24 which is inoperative with the solenoid 29 de-energised, and through the outer end of the bore 8. Pressure from the secondary pressure space 3 is also applied at the same time to the brake 4 through the inner end of the bore 9, the open isolating valve 17, and the inner end of the bore 8.

The first balance piston 12 is normally held by the spring 14 in a retracted position in engagement with the partition 11 to hold the isolating valve 19 open, and the pressures from both pressure spaces 2, 3 act on opposite ends of the piston 12. At a lower pressure, say 1 bar, the second fail-safe piston 13 moves towards the partition 11 into an advanced position against the force in the spring 15 since substantially equal pressures from both pressure spaces 2, 3 act on opposite ends of the piston 13 which are of different effective areas. Since the outer end of the piston 13 is of greater effective area, the piston 13 is subjected to a net force sufficient to overcome the load in the spring 15. The movement of the piston 13 towards the partition 11 releases the valve 17, which is then only held open by the load in the spring 23. The second piston 13 moves in this manner on each and every normal brake application so that any possibility of it becoming wedged in the bore 9 is substantially eliminated.

When the control module emits an electronic current in response to a signal from either sensor 25 or 26, the solenoid 29 is energised, in turn to actuate the modulator 24. Actuation of the modulator 24 isolates or restricts the line from the master cylinder 1 to the brake 5, and acts to relieve the pressure applied to that brake. Such relief of pressure upsets the force equilibrium on the first balance piston 12. Due to the pressure acting on the end of the first piston 12 adjacent to the partition 19, the piston 12 moves relatively away from the partition 19. Initial movement of the piston 12 in this direction permits the isolating valve 17 to close and isolate the brake 4 from the master cylinder 1, and subsequent movement in the same direction relieves the pressure applied to the rake 4 by dumping the fluid from the brake 4 into a chamber defined between the first piston 12 the inner end of the bore 8 and of which the effective volume increases with movement of the first piston 12 in that direction.

When the wheel recovers, the modulator 24 permits a controlled application of pressure to the brake 5 and, in response to that pressure, the first balance piston 12 moves relatively towards the partition 11 in order to re-apply the brake 4 by displacing fluid from the inner end of the bore 8.

During the braking sequences described above, the fail-safe piston 13 remains in its position spaced from the outer end of the bore 9.

Should the line from the primary pressure space 2 fail, the fail-safe piston 13 will immediately move relatively away from the partition 11 due to pressure in the secondary pressure space 3. This opens the isolating valve 17, if it had already closed as a result of an anti-lock cycle. The brake 4, if inoperative, is then applied from the secondary pressure space 3 through the open isolating valve 17. Under such conditions the brake 4 will not be controlled by the modulator 24. Thus the wheel controlled by that brake 4 can lock if the applied pressure is sufficiently high. However, as the brake 5 is off, the wheel controlled by the brake 5 can rotate freely. This provides the vehicle with lateral or sideways stability.

Should the line from the pressure space 3 fail, the brake 5 is fully applied by the master cylinder 1 but may still be controlled by the modulator 24. The wheel controlled by the inoperative brake 4 will rotate freely to provide lateral or sideways stability.

In the anti-lock braking system illustrated in FIG. 2 of the drawings each front wheel brake 30, 31 is fitted with a separate wheel speed sensor 32, 33 connected to the control module 27, and the pressure spaces 2, 3 of the master cylinder 1 are connected to respective front wheel brakes 30,31 through respective modulators 34, 35, each similar to the modulator 24, and each controlled by a respective electrical solenoid 36,37.

In operation, the secondary or floating piston of the tandem master cylinder, which works in a portion of the bore is advance of the primary piston and pressurises the secondary pressure space 3, travels to apply the front wheel brake 30 directly, and the diagonally opposite rear brake 4 indirectly through the copy valve 6. The initial movement of the primary piston takes up the clearances for both secondary and primary pistons. Although the secondary piston travels to apply the front brake 30 and the rear brake 4 as described above, when the anti-lock cycle is evoked it only returns to accommodate the volume of the front wheel brake 30 since the volume of the rear wheel brake 4 is transferred to the primary piston by the copy valve 6.

This enables us to incorporate a tandem master cylinder of the AS/AS type in which a seal on each piston is adapted to close a radial recuperation port in the wall of the cylinder. Since the primary pressure space can accommodate substantially twice the displacement of the secondary piston, it is able to accommodate the volume referred to above without reaching the vent hole in the wall of the cylinder.

Care must be taken in the system of FIG. 2 to ensure that the secondary pressure space 3 is connected to the rear wheel brake 4 which is, in turn, connected to the copy valve 6, otherwise the seals on the pistons of the master cylinder 1 may blow.

Figure 3:
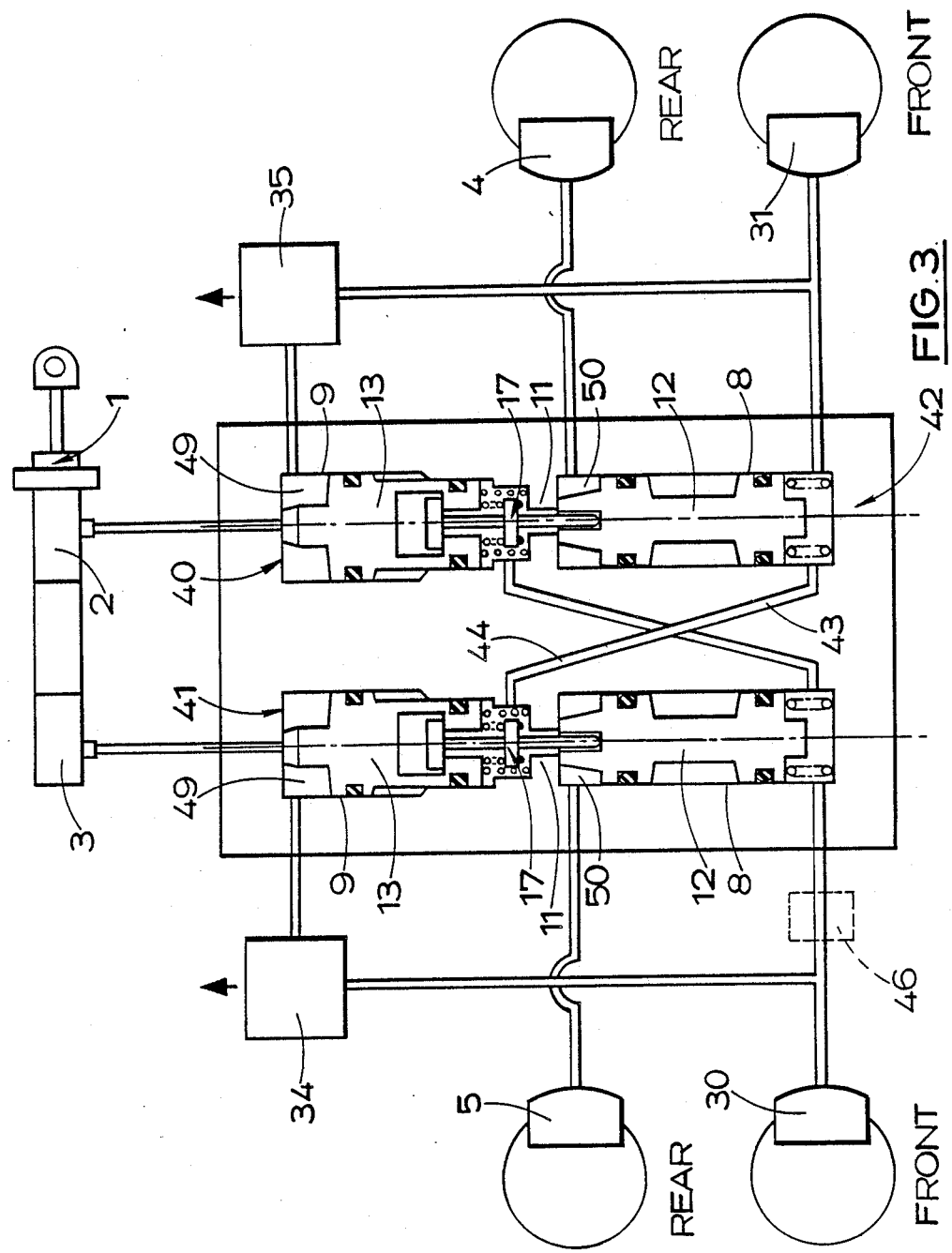
FIG. 3 is a layout of another anti-lock braking system.

In the X split two-channel anti-lock hydraulic braking system shown in the layout of FIG. 3, two copy valves, 40 and 41, each of a construction similar to the copy valve 6 of FIG. 1, are located in a common housing 42, to provide a twin unit. The inner end of each bore 9 of the copy valve 40 is connected to the outer end of the bore 8 of the copy valve 41 through a diagonal passage 43, and the inner end of the bore 9 of the copy valve 41 is similarly connected to the outer end of the bore 8 of the copy valve 40 through a diagonal passage 44.

The primary pressure space 2 is connected to the front brake 31 through the modulator 35 and through the diagonal passage 43 to the rear brake 5 through, the isolating valve 17 of the copy valve 41.

Similarly the secondary pressure space 3 is connected to the front brake 30 through the modulator 34 and through the diagonal passage 44 to the rear brake 4 through the isolating valve 17 of the copy valve 40.

Thus, when the brakes are applied normally, each front wheel brake and the diagonally opposite rear wheel brake are both applied from different pressure spaces of the master cylinder 1, with each copy valve 40, 41 operating as described above, normally with the pistons 13 moving forward and the isolating valves 17 remaining open.

The layout of FIG. 3 provides a "sense low" philosophy for the rear brakes 4, 5 irrespective of which front wheel is corrected in an anti-lock situation.

For example, if the two left hand wheels provided with the brakes 5, 30 are on a low friction surface and the two right hand wheels, provided with the brakes 4,31, are on a high friction surface and a skid is sensed by the sensor of the left hand front wheel, then not only will the brake 4 on the diagonally opposite right hand rear wheel be relieved but also the brake 34 on the left hand rear wheel due to the action of the left hand copy valve 41. The right hand copy valve 40 will not operate until the right hand rear wheel has been corrected. This will prevent a rear wheel lock on a split $\mu$ surface and improve the stability of the vehicle.

In a normal two-channel system, only the front wheels are fitted with speed sensors. If sensors are fitted to each wheel, it is unusual to reduce pressure applied to a front wheel brake if a rear wheel tends to lock because the rear wheel which is on the surface of low $\mu$ will otherwise relieve the pressure applied to the brake on the front wheel which is on the surface of high $\mu$. This is undesirable since, in consequence, the stopping distance will increase.

A solution is to permit the first rear wheel to lock and only remove the brake on the front wheel which is travelling on the surface of low friction when the second rear wheel locks. This achieves improved stopping distance but with the disadvantage of poor stability for the vehicle.

In the layout of FIG. 3, a premature locking of a rear wheel will permit the brake on the front wheel on the same side to be relieved, i.e. we can relieve the brakes on the two wheels which are travelling over the surface low friction together with the rear which is travelling over the good surface. Not only will this provide an improved stopping distance but it also achieves good stability.

On four wheel-drive vehicles, there is a torque transmission during braking between the front and rear axles so that a system with independent control for the front wheel brakes and "sense low" for the rear wheel brakes will provide good stopping power and satisfactory stability.

The layout of FIG. 3 is therefore ideal for vehicles of the four-wheel drive type.

In the system of FIG. 3 the twin version 42 of the copy valve will reduce both rear brake pressures to substantially the same level in response to action from either of the two front anti-lock modulators 34 or 35, i.e. a sense low philosophy at the rear.

The system may be fitted with a rear apportioning valve 46 between either front brake and the inlet to the respective copy valve 40 or 41 to give apportioning of both rear brakes 4 and 5. Alternatively, two apportioning valves can be fitted. In such a case, the pressure to both rear wheel brakes will be determined by the valve at the lowest pressure. This latter feature will provide improved stability when cornering.

I claim:

1. An hydraulic anti-lock braking system for a vehicle of the four wheel type comprising first and second separate brake means, a tandem master cylinder having a primary pressure space, and a secondary pressure space, an anti-lock modulator, and a copy value, wherein said valve comprises a housing having a first bore, and a second bore of stepped outline, a partition between said first and second bores, a first piston working in said first bore and hydraulically connected at opposite ends to said separate brake means, a second piston working in said second bore and hydraulically connected at opposite ends to said pressure spaces of said master cylinder, said second piston being of complementary differential outline, said pistons being movable relative to each other between a first operative position, a second position in which said first piston moves relatively away from said second piston, and a third position in which said second piston moves relatively away from said first piston, and an isolating valve co-operating with both said pistons and said partition, said isolating valve being in an open position when said pistons are in said first position, in a closed position when said pistons are in said second positions, and in an open position when said pistons are in said third position, said second piston having outer and inner ends, connecting means connecting said primary pressure space to said outer end, and a first spring means acting between said inner end and said partition to urge said second piston relatively away from said partition whereby upon failure of said connecting means said pistons are moveable into said third position by said first spring means, and said second piston co-operates with said isolating valve to hold said isolating valve open.

2. A system according to claim 1, wherein each said piston is provided with only two seals.

3. A system according to claim 2, wherein said master cylinder comprises a tandem master cylinder of the AS/AS type.

4. A system according to claim 1, wherein a second spring acts to bias said isolating valve into said open position.

5. A system according to claim 4, wherein said master cylinder comprises a tandem master cylinder of the AS/AS type.

6. A system according to claim 1, wherein said secondary pressure space is connected only to said first brake means through said isolating valve, and said pressure space is connected directly to an end of said second piston which is remote from said first piston and indirectly to said second brake means through said modulator.

7. A system according to claim 6, wherein said master cylinder comprises a tandem master cylinder of the AS/AS type.

8. A system according to claim 1, wherein said first and second brake means comprise the separate brakes on rear wheels of said vehicle, each having a speed sensor, and said modulator is responsive to a signal from either or said speed sensors.

9. A system according to claim 8, wherein said master cylinder comprises a tandem master cylinder of the AS/AS type.

10. A system according to claim 1, wherein a single copy valve, and a single modulator are provided for controlling the behaviour of brakes on two rear wheels of the vehicle.

11. A system according to claim 10, wherein said master cylinder comprises a tandem master cylinder of the AS/AS type.

12. A system according to claim 1, wherein said first and second brake means comprise corresponding halves of two twin-piston front wheel brakes.

13. A system according to claim 12, wherein said master cylinder comprises a tandem master cylinder of the AS/AS type.

14. A system according to claim 1, wherein a secondary piston working in a portion of a bore in front of the primary pressure space pressurises said secondary pressure space, travels to apply a front wheel brake directly and to apply the diagonally opposite rear wheel brake indirectly through said copy valve.

15. A system according to claim 14, wherein when an anti-lock signal is evoked said secondary piston only returns to accommodate the volume of fluid from said front brake since the volume of said rear brake is transferred to said primary piston by said copy valve.

16. A system according to claim 15, wherein said master cylinder comprises a tandem master cylinder of the AS/AS type.

17. A system according to claim 14, wherein said master cylinder comprises a tandem master cylinder of the AS/AS type.

18. A system according to claim 1, wherein said master cylinder comprises a tandem master cylinder of the AS/AS type.

19. A anti-lock hydraulic braking system for a vehicle having brakes on front wheels and brakes on rear wheels, said system comprising a tandem master cylinder having a primary pressure space and a secondary pressure space, an anti-lock modulator for each front wheel brake, and a copy valve assembly, wherein said copy valve assembly comprises first and second copy valves, each said copy valve comprising a housing having a first bore, and a second bore of stepped outline, a partition between said first and second bores, a first piston working in said first bore and hydraulically connected at opposite ends to first and second separate brake means, a second piston working in said second bore and hydraulically connected at opposite ends to said pressure spaces of said master cylinder, said second piston being of complementary differential outline, said pistons being movable relative to each other between a first operative position, a second position in which said first piston moves relatively away from said second piston, and a third position in which said second piston moves relatively away from said first piston, and an isolating valve co-operating with both said pistons and said partition, said isolating valve being in an open position when said pistons are in said first position, in a closed position when said pistons are in said second position, and in an open position when said pistons are in said third position, said second piston having outer and inner ends, connecting means connecting one of said pressure spaces to said outer end, a first spring means acting between said inner end and said partition to urge said second piston relatively away from said partition whereby upon failure of said connecting means said pistons are movable into the said third position by said first spring means and said second piston co-operates with said isolating valve to hold said isolating valve open, said pressure spaces are each connected to said outer end of a respective one of said second pistons and to an inner end of said first piston of the other copy valve through a respective one of said anti-lock modulators, and wherein connections are provided between said rear wheel brakes and the inner ends of said first bores in which said first pistons work, whereby to control the behavior of one of said front wheel brakes and said brake on a diagonally opposite rear wheel.

20. A system according to claim 19, wherein said master cylinder comprises a tandem master cylinder of the AS/AS Type.

* * * * *